US 11,999,489 B2

United States Patent
Zimmermann

(10) Patent No.: US 11,999,489 B2
(45) Date of Patent: Jun. 4, 2024

(54) AIRCRAFT PASSENGER SEAT, AND SEAT ROW

(71) Applicant: ZIM AIRCRAFT SEATING GMBH, Immenstaad am Bodensee (DE)

(72) Inventor: Peter Zimmermann, Ueberlingen (DE)

(73) Assignee: Zim Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 17/818,737

(22) Filed: Aug. 10, 2022

(65) Prior Publication Data

US 2022/0380054 A1 Dec. 1, 2022

Related U.S. Application Data

(63) Continuation of application No. PCT/EP2021/055374, filed on Mar. 3, 2021.

(30) Foreign Application Priority Data

Mar. 5, 2020 (DE) ..................... 10 2020 106 039.4

(51) Int. Cl.
*B64D 11/06* (2006.01)

(52) U.S. Cl.
CPC ...... *B64D 11/0648* (2014.12); *B64D 11/0606* (2014.12); *B64D 11/0696* (2013.01); *B64D 11/0649* (2014.12)

(58) Field of Classification Search
CPC ............ B64D 11/0649; B64D 11/0648; B64D 11/0646; B61D 33/0014
See application file for complete search history.

(56) References Cited

U.S. PATENT DOCUMENTS

| 4,632,452 A | 12/1986 | Vogel |
| 4,898,426 A | 2/1990 | Schulz et al. |

(Continued)

FOREIGN PATENT DOCUMENTS

| DE | 38 11 939 A1 | 10/1989 |
| EP | 0 197 167 A1 | 10/1986 |

(Continued)

OTHER PUBLICATIONS

Rejab, M. R. M., & Cantwell, W. J. (2013). The mechanical behaviour of corrugated-core sandwich panels. Composites Part B: Engineering, 47, 267-277. (Year: 2013).*

(Continued)

*Primary Examiner* — Richard Green
(74) *Attorney, Agent, or Firm* — BURR PATENT LAW, PLLC

(57) ABSTRACT

An aircraft passenger seat including a support framework designed to be fastened to a floor in an aircraft passenger cabin. The support framework has a seat divider and cross rails running transversely to the seating direction, and the support framework is held by the cross rails, a housing including a structural component, and the housing at least partly surrounds a backrest. The structural component is provided on the seat divider, and includes a compound sheet component having one or more cover sheets, with a connecting structure provided between a plurality of cover sheets, more particularly between two cover sheets. The connecting structure creates gaps between the cover plates, and the volume of the gaps makes up at least 50% of the volume between the cover sheets of the compound sheet component.

11 Claims, 5 Drawing Sheets

(56) References Cited

U.S. PATENT DOCUMENTS

| | | | |
|---|---|---|---|
| 9,592,913 B2* | 3/2017 | Bell | B64D 11/0649 |
| 10,464,679 B2* | 11/2019 | Hoover | B60N 2/995 |
| 2004/0004382 A1 | 1/2004 | Dowty | |
| 2012/0138744 A1* | 6/2012 | Fullerton | B64D 11/0649 |
| | | | 29/428 |
| 2017/0015420 A1 | 1/2017 | Henshaw et al. | |
| 2017/0028888 A1* | 2/2017 | Seibold | B60N 2/686 |
| 2017/0283061 A1 | 10/2017 | Papke et al. | |
| 2019/0367170 A1 | 12/2019 | Carlioz et al. | |

FOREIGN PATENT DOCUMENTS

| | | |
|---|---|---|
| EP | 2 767 469 A1 | 8/2014 |
| EP | 2 905 226 A1 | 8/2015 |
| EP | 3 238 989 A1 | 11/2017 |
| WO | 2006/059118 A1 | 6/2006 |

OTHER PUBLICATIONS

English translation of the International Preliminary Report on Patentability (Chapter 1) dated Sep. 15, 2022 (Application No. PCT/EP2021/055374).

German Search Report (Application No. 10 2020 106 039.4) dated Mar. 4, 2021.

International Search Report and Written Opinion (Application No. PCT/EP2021/055374) dated Jun. 24, 2021 (with English translation).

* cited by examiner

AIRCRAFT PASSENGER SEAT, AND SEAT ROW

CROSS REFERENCE TO RELATED APPLICATIONS

This application is a continuation of International Application No. PCT/EP2021/055374 filed Mar. 3, 2021, which designated the United States, and claims the benefit under 35 USC § 119(a)-(d) of German Application No. 10 2020 106 039.4 filed Mar. 5, 2020, the entireties of which are incorporated herein by reference.

FIELD OF THE INVENTION

The present invention relates to an aircraft passenger seat and a seat row constructed from at least two such aircraft passenger seats.

BACKGROUND OF THE INVENTION

Aircraft passenger seats and seat rows with a plurality of adjacently arranged aircraft passenger seats are known for equipping passenger aircraft. The aircraft passenger seats may have a plurality of embodiments.

All aircraft passenger seats have to correspond to safety guidelines. At the same time, the seats are designed to have a weight which is as low as possible. Moreover, a compact external shape is desired. In order to optimize the weight, preferably lightweight construction materials, such as, for example, aluminum, are used. Similarly, components of the aircraft passenger seat have recesses in the material, which also contributes to a reduction in the weight.

The aircraft passenger seat has to be constructed such that it fulfills specifications which have to be demonstrated as a result of tests, in particular, crash tests, prescribed by the safety guidelines. To this end, components which are sufficiently mechanically stable and/or resilient are required, as are stable connections between the different components of the aircraft passenger seat.

SUMMARY OF THE INVENTION

It is the object of the present invention to provide an aircraft passenger seat which is improved regarding weight and stability.

Hereinafter, all directions are specified relative to a seating direction, wherein the seating direction is to be understood to mean the direction in which an aircraft passenger looks when he or she has sat down on the aircraft passenger seat.

The present invention is based on an aircraft passenger seat comprising a support framework which is designed to be fastened to a floor in an aircraft passenger cabin, wherein the support framework has a seat divider and cross rails running transversely to the seating direction, wherein the seat divider is held by the cross rails, wherein a housing comprises a structural component, wherein the housing at least partially surrounds a backrest.

Preferably, the aircraft passenger seat comprises, in addition to the support framework and the housing, a head restraint, a backrest, a seat base and a leg support. These, for example, four, essential parts of the aircraft passenger seat are preferably connected together, for example, via hinges or other mechanisms, and are advantageously able to be set, in particular, adjusted, relative to one another.

The floor of the aircraft passenger cabin is denoted by the term "bottom", whilst an opposing position is denoted by the term "top", which is arranged, in particular, vertically spaced apart relative to the bottom.

Preferably, the structural component and/or the seat divider and/or the cross rails are produced from a metal material, for example, a light metal, advantageously from aluminum, or from a different lightweight and stable material, and/or, for example, from a composite material, in particular, from a carbon-fiber composite material. Advantageously, all of the components of the aircraft passenger seat are optimized regarding the materials thereof and the weight associated therewith. In particular, a shape and/or a contour of the components is also optimized regarding the weight, so that the components have, for example, material recesses which also contribute to a weight saving.

The aircraft passenger seat is able to be arranged above the support framework on the floor of an aircraft passenger cabin. The support framework is configured, for example, as a load-bearing structure of the aircraft passenger seat, in particular, the support framework is mechanically stable. The support framework comprises the seat divider and the cross rails running transversely to the seating direction, wherein a first front cross rail and a second cross rail arranged therebehind, when viewed in the seating direction, are present. Preferably, both cross rails are arranged on the seat divider. Advantageously, the two cross rails run spaced apart, in particular, generally parallel, to one another. Advantageously the cross rails are oriented horizontally.

The seat divider is configured as a mechanically stable component of the aircraft passenger seat. In particular, the seat divider is designed to absorb forces which act in the event of a crash on the aircraft passenger seat and/or to conduct the forces via the support framework in the direction of the floor of the aircraft cabin and/or to divert the forces into the floor.

Viewed in the seating direction, the seat divider has a height, a width and a depth. The width of the seat divider is preferably smaller, for example, in the single-digit centimeter range, than the depth of the seat divider. For example, the height of the seat divider results from a dimension in the vertical direction relative to the aircraft passenger seat. Preferably, the height of the seat divider is a multiple of the width and/or the depth of the seat divider.

The housing may be arranged, in particular, fastened, to the seat divider. The housing at least partially surrounds the backrest of the aircraft passenger seat. In a preferred embodiment, the aircraft passenger seat comprises the housing which is able to be arranged in the region of the backrest. For example, in the region of the housing the backrest is adjustably, in particular, movably, guided relative to the housing. Preferably, the housing is fixed, for example, positionally fixed and, in particular, immovable during the adjustment of the backrest. Preferably, the housing comprises the structural component. In an advantageous variant, the structural component is arranged inside the housing.

Preferably, two seat dividers are present for each aircraft passenger seat. For example, the two seat dividers are arranged spaced apart from one another in the width direction, in particular, to the side on the right and left, relative to the seating direction on the aircraft passenger seat. Preferably, the two seat dividers are arranged parallel to one another. Advantageously, two planes spanned in each case by the height and depth of the respective seat divider are arranged at least approximately parallel. In particular, the aircraft passenger seat is defined on both sides by the seat dividers, advantageously in the region of the seat base.

Preferably, the seat divider is designed to be mechanically load-bearing such that, for example, the belt attachment points for the safety belt for the aircraft passenger may be arranged on, for example, screwed to, the seat divider. The seat divider is able to be connected at the bottom to the aircraft passenger cabin floor by a support foot structure of the support framework.

The essential idea of the present invention is that the structural component is arranged on the seat divider, wherein the structural component comprises a composite plate component, wherein the composite plate component has one or more cover plates, wherein a connecting structure is provided between a plurality of cover plates, in particular, between two cover plates, wherein gaps are produced between the cover plates by the connecting structure, wherein the volume of the gaps makes up at least 50% of the volume between the cover plates of the composite plate component.

For example, the structural component is arranged by means of a connecting device, for example, a plug connection, on the seat divider. Preferably, the structural component and the seat divider are rigidly connected together, in particular, connected together in a stable and/or immovable and/or fixed manner, in particular, connected together in a mechanically stable manner. Preferably, the structural component is configured as a planar and/or plate-shaped element. Preferably, starting from the seat divider, the structural component extends upwardly away from the floor of the aircraft passenger cabin.

Advantageously, the structural component comprises a composite plate component, in particular, the structural component consists of a composite plate component.

Preferably, the composite plate component has one or more cover plates, wherein the connecting structure is provided between a plurality of cover plates, in particular, between two cover plates. The connecting structure advantageously results in a mechanically stable composite plate component, in particular, in the event of a compressive load on a surface of the cover plates, with at the same time a low weight of the composite plate component. In a further possible embodiment, a further composite plate component with, for example, three cover plates is possible so that a construction of the further composite plate component results as follows: cover plate, connecting structure, cover plate, connecting structure, cover plate.

By means of the planar design of the cover plates, for example, a plane is spanned, in particular, the plane comprises a surface. Preferably, a volume is formed by the surface of the cover plates and the spacing between the cover plates.

Preferably, the cover plates have a thickness of a few millimeters. For example, a spacing is defined between two cover plates as a length of the surface normal between the two plates.

Preferably, gaps are provided between the cover plates by the connecting structure. For example, the volume of the gaps is at least 50% of the volume between the cover plates of the composite plate component. Preferably, the volume is 80% to 99%, in particular 95%.

For example, the composite plate component is of planar design, in particular, the composite plate component has a length, a width, and a height. The length and/or width of the composite plate component are a multiple of the height of the composite plate component.

For example, the connecting structure has a material volume, in particular, a material volume of the connecting structure inside the cover plates.

Advantageously, the gaps are produced with their volume as a difference between the volume between the cover plates without the connecting structure, minus the material volume of the connecting structure.

In a preferred embodiment, the cover plates of the composite plate component are designed to be planar and thin. For example, the thickness of the cover plates is a few millimeters, in particular 1 to 3 millimeters.

Preferably, the two cover plates of the composite plate component are arranged, in particular, approximately parallel to one another. Advantageously, a gap is produced between the cover plates by the spaced-apart arrangement of the cover plates. For example, a spacing is produced between the cover plates by the spaced-apart arrangement of the cover plates to one another, in particular, the spacing is the same at virtually every position between the cover plates.

In an advantageous variant, the surface of the cover plate is the same as a surface of the composite plate component formed from the length and the width of the composite plate component.

In a preferred variant, the connecting structure extends in a cross section of the composite plate component alternating between the cover plates, wherein the alternating connecting structure is in contact with the cover plates.

For example, a plan view of the height of the composite plate component at the same time is the cross section through the composite plate component with the connecting structure. Preferably, the connecting structure is configured to be alternating, in particular, repeating, in particular, regularly repeating. Preferably, the connecting structure has a height which corresponds approximately to the height between the two cover plates of the structural component configured as the composite plate component. For example, the connecting structure is arranged between the cover plates such that the connecting structure and the cover plates are in contact.

Advantageously, the contact between the connecting structure and the cover plates is made at a plurality of points.

In an advantageous embodiment, the alternating connecting structure has maximum points, wherein the alternating connecting structure is connected to the cover plates at some of the maximum points.

Preferably, the connecting structure is configured as a regular structure. An irregular connecting structure is also possible, for example, a foam-like structure. The connecting structure comprises, for example, maximum points, wherein in particular a point which is configured to be raised in comparison with the surrounding connecting structure is denoted as a maximum point and, in particular, a point contact results.

Preferably, all of the maximum points are connected to the cover plates which are respectively in contact. Preferably, the connection between the cover plates and connecting structure is possible, for example, by means of an adhesive and/or soldering and/or welding.

In a further advantageous embodiment, the maximum points run along a line. Preferably, the maximum points form a straight line, in particular, with a line contact.

Preferably, the maximum points runs along a strip with a contact surface. For example, the maximum points are configured as the strip with the contact surface. For example, the maximum points have a length along the line, as well as a width. Preferably, the strip with the contact surface on the cover plates, which is configured, in particular, as a surface contact, is produced by the length and the width.

In an advantageous embodiment, the strip has a boundary of the contact surface. In particular, the boundary is configured as a border. For example, the border exhibits a non-linear path, and, in particular, the border is configured to be wave-shaped and/or with indentations. Preferably, a line is present inside the contact surface which is configured, in particular, as a straight line.

In an advantageous embodiment, the connecting structure is configured to be wave-shaped in cross section.

For example, the connecting structure in cross section has a wave, in particular, the wave comprises a wave trough and a wave crest. Advantageously, both the wave crest and the wave trough comprise an apex, in particular, a line of apexes of the wave crests and/or wave troughs is produced. Preferably, the wave-shaped connecting structure is configured as a type of sinusoidal wave. In an advantageous variant, the apex lines of the wave troughs are oriented parallel to one another, furthermore the apex lines of the wave crests are oriented parallel to one another and/or the apex lines of the wave crests are oriented parallel to the apex lines of the wave troughs.

For example, a honeycomb-like and/or lattice-like configuration of the connecting structure is also possible.

In an advantageous embodiment, the lines of the maximum points and/or the strips of the contact surfaces within the composite plate component are oriented approximately parallel to one another. Preferably, they are straight lines or straight strips with a contact surface, and, in particular, a straight line is configured inside the border of the contact surface. For example, the lines are oriented substantially parallel to one another, in particular, generally parallel. For example, an angle between two lines should not exceed a deviation of 5°.

In an advantageous embodiment, the structural component has a long side with a long edge and a comparatively shorter side with a shorter edge, and the straight lines and/or the straight strips of the maximum points of the connecting structure in the composite plate component are oriented parallel to the long edge of the structural component.

Advantageously, due to the orientation of the connecting structure with the straight lines and/or the straight strips, which is preferably parallel or slightly inclined, for example, at a small angle, with, for example, a deviation of a few degrees, in particular 1° to 10° from the long edge of the structural component, a mechanically very stable component results, in particular, with a tensile and/or compressive load on the long side of the structural component or on the long edge on the long side. For example, the tensile and/or compressive load is produced by a load, in particular, the tensile load is produced by a force which acts on the safety belt of the aircraft passenger. Advantageously, the vector of the force acting on the structural component is generally located in a main plane spanned by the depth and the height of the structural component. For example, forces with this direction are produced, or a force vector in this direction in the event of a load case, for example, a crash.

For a correct orientation of the connecting structure, for example, the structural component is cut out, for example, sawn out, of a panel of the composite plate component, in particular, in order to ensure the correct orientation.

Preferably, the composite plate component comprises a portion made of a metal. For example, the entire composite plate component is produced from a metal, in particular, a light metal, for example, aluminum and/or from a composite material. In a further embodiment, one or both cover plates are produced from a metal, for example, aluminum, and the connecting structure is produced from a plastics material and/or from a composite material, for example, carbon-fiber mats. A reverse selection of materials is also possible for the cover plates and the connecting structure.

In an advantageous embodiment, a structural component is arranged on the aircraft passenger seat on each seat divider, in particular, connected to the seat divider. For example, the aircraft passenger seat comprises further structural components which are arranged, in particular, at an angle to the structural components arranged on the seat divider. These further structural components are also able to be designed as composite plate components.

A seat row consists of at least two aircraft passenger seats as claimed in one of the aforementioned embodiments. Preferably, the seat row consists of two aircraft passenger seats, wherein the two aircraft passenger seats have a common support framework for fastening to the cabin floor. For example, the cross rails are arranged on the support foot structure, the seat dividers being arranged thereon in turn. The two aircraft passenger seats, for example, comprise common cross rails. In a preferred variant, two seat dividers are arranged on the cross rails for each aircraft passenger seat. Preferably, the structural components are arranged on the seat dividers via the connecting device. In particular, the structural components comprise the composite plate components with the connecting structure. Preferably, the connecting structure is designed to be wave-shaped between the cover plates. For example, the orientation of the apex lines of the wave crests and wave troughs is parallel to the long edge of the structural component.

BRIEF DESCRIPTION OF THE D WINGS

Further advantageous features, designs, variants and embodiments are described in more detail with reference to a schematic exemplary embodiment.

DETAILED DESCRIPTION OF THE INVENTION

Figure 3:
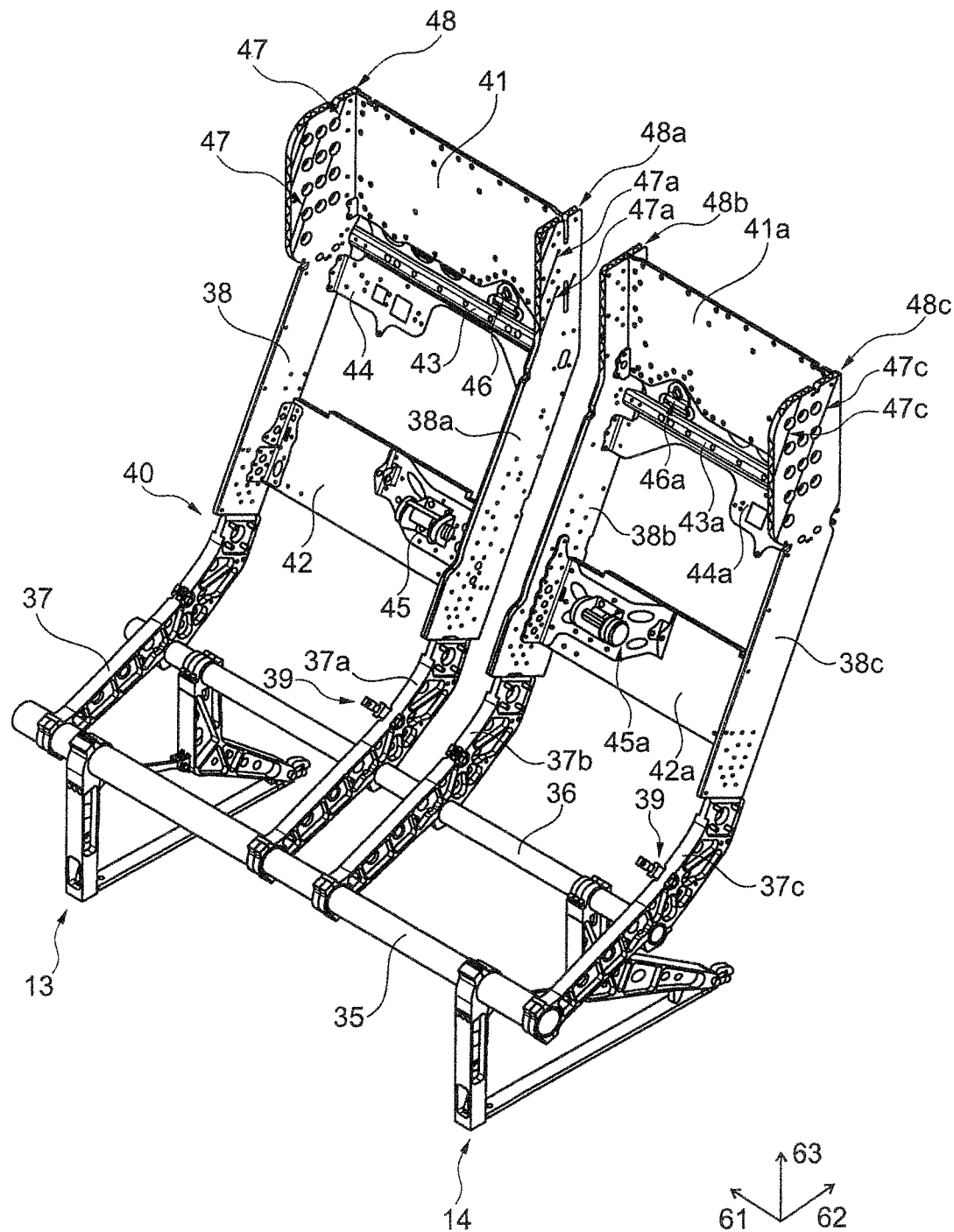
FIG. 3 shows a part of a basic structure with a support framework and a plurality of structural components of the seat row of FIG. 1 in a perspective view obliquely from the front.
Figure 4:
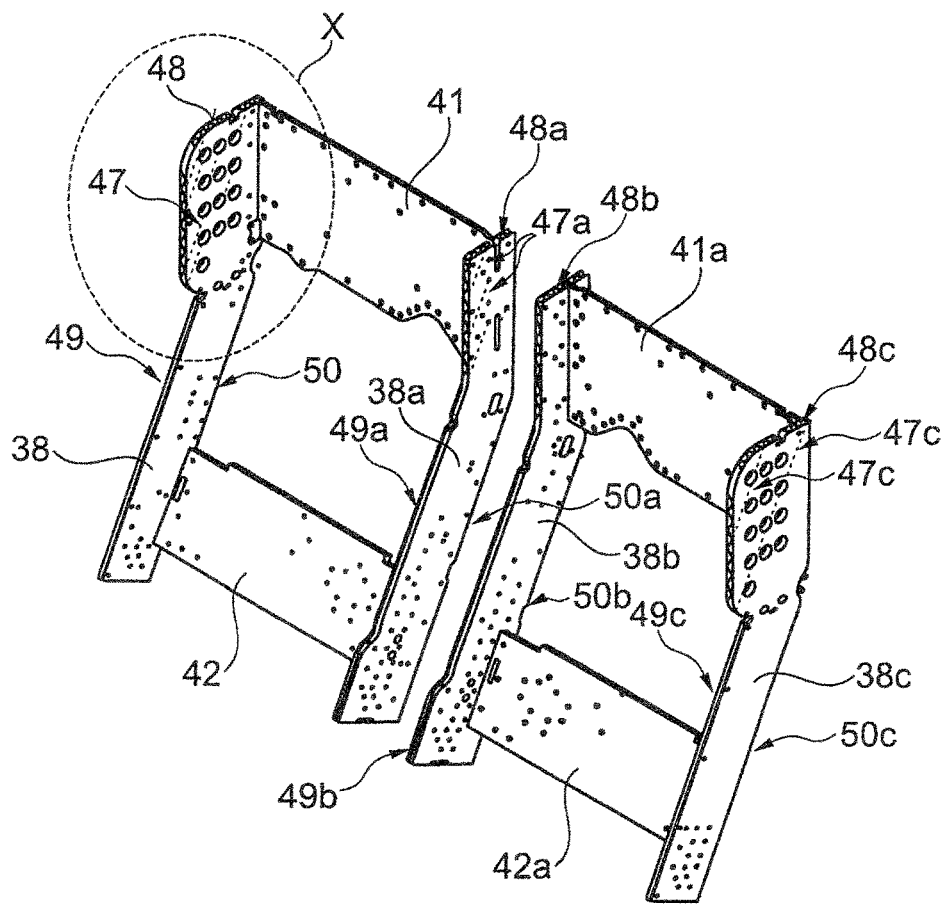
FIG. 4 shows parts of the basic structure of the aircraft passenger seats 3 and 4 with a detail X, in an oblique lateral view.
Figure 5:
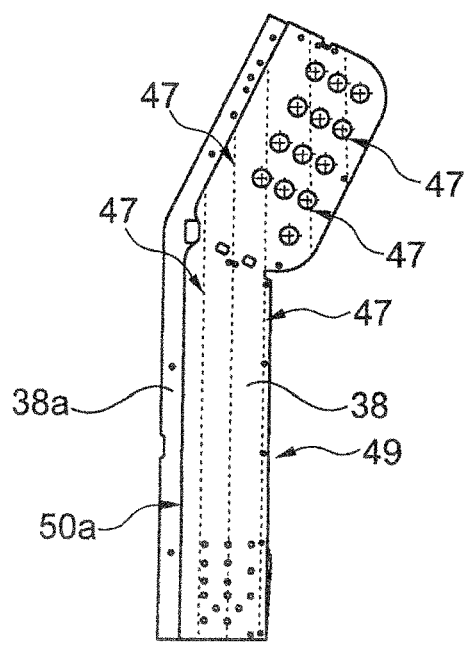
FIG. 5 shows a lateral plan view of two structural components of the aircraft passenger seat 1.

Further components, which are not shown in FIGS. 3 to 5, are required for a usable functional aircraft passenger seat. Only the components required for the connecting device are described in detail.

Figure 1:
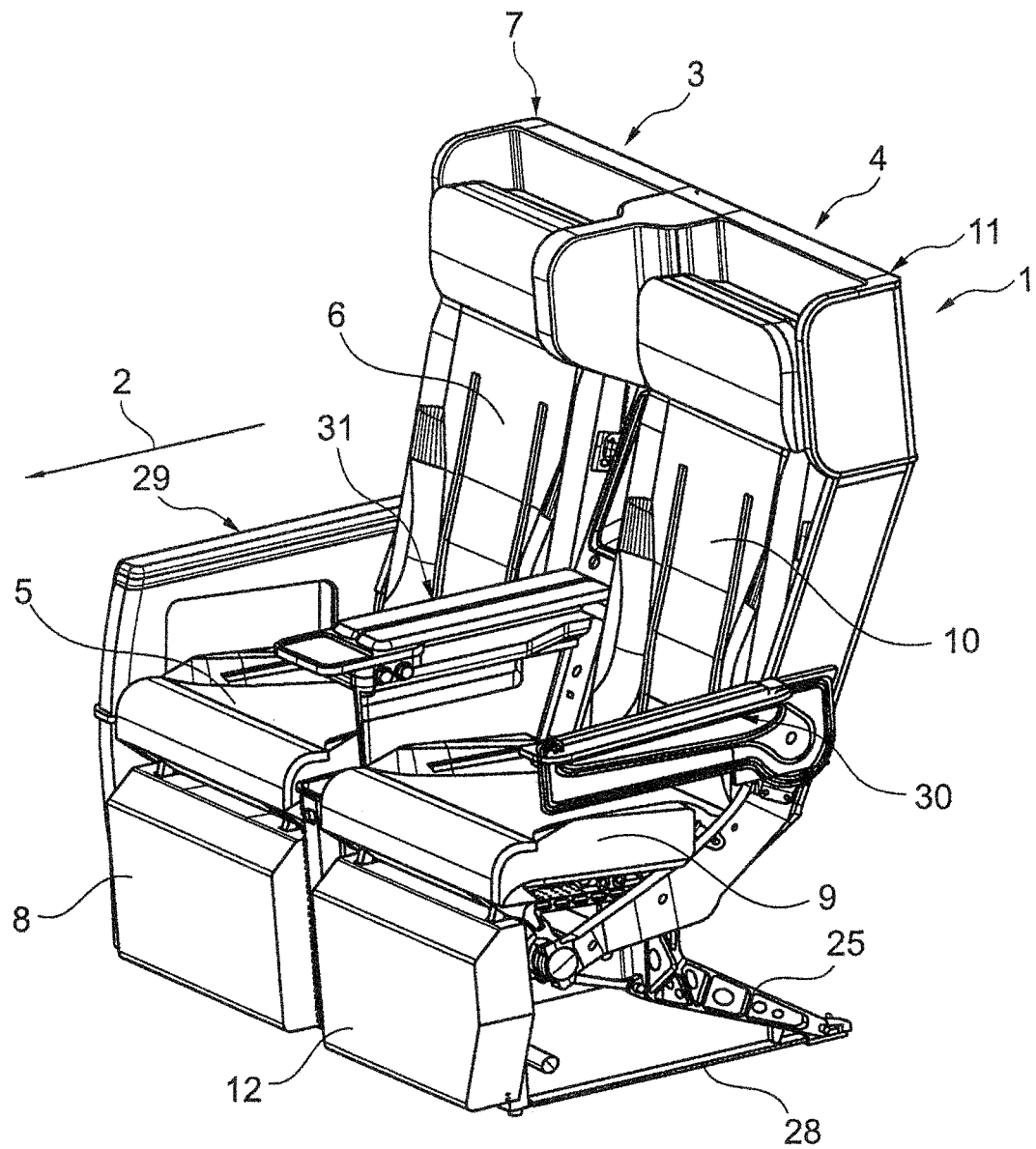
FIG. 1 shows a perspective view obliquely from the front of a seat row with two aircraft passenger seats, in each case comprising a seat base, a backrest, together with a rear housing and a leg support.

FIG. 1 shows a seat row 1 with a seating direction 2 with two aircraft passenger seats 3 and 4. Hereinafter positional and directional information such as front, rear, top and bottom refer to the seating direction 2 and to the use state of the seat row 1.

The two aircraft passenger seats 3 and 4 are correspondingly constructed. The aircraft passenger seat 3 has a seat base 5, a backrest 6 and a rear housing 7 for the backrest 6.

Adjoining a front end region of the seat base 5 is a preferably foldable leg support 8 which is foldable about a horizontal axis.

Accordingly, the aircraft passenger seat 4 comprises a seat base 9, a backrest 10, a housing 11 and a leg support 12.

The seat base 5, 9, the backrests 6, 10 and the leg supports 8, 12 comprise a preferably ergonomically shaped upholstery.

The aircraft passenger seats 3 and 4 are able to be mounted via two support legs 13 and 14 on a cabin floor of an aircraft cabin of an associated aircraft.

To this end, the support leg 13 has a mounting point 17 on a lower end region 16 of a front strut 15, and a further mounting point 20 on a lower end region 19 of a rear strut 18. A bracing element 21 is provided between the end regions 16 and 19.

The support leg 14 has a mounting point 24 on a lower end region 23 of a front strut 22 and a further mounting point 27 on a lower end region 26 of a rear strut 25. A bracing element 28 is provided between the end regions 23 and 26.

The seat row 1 additionally has an outer armrest 29 to the side on the aircraft passenger seat 3 and an outer armrest 30 to the side on the aircraft passenger seat 4. Preferably, a console 31, which may also be used by an aircraft passenger as an arm support, is present between the two aircraft passenger seats 3 and 4 level with the two outer armrests 29 and 30.

The respectively associated backrest 6 or 10 is arranged in a shell shape of the respective housing 7 or 11. The backrest 6 or 10 is preferably movably guided in the housing 7 or 11 for setting different tilted positions, for example, together with the associated displaceably mounted aircraft passenger seat base 5 or 9.

The housings 7 and 11 are provided with further elements, for example, on the rear face, in each case with additional functions. For example, in each case a multimedia unit 32 for digital media is provided in an upper rear region of the housings 7, 11, for example, with an electronic input and output device or with a touchscreen.

Figure 2:
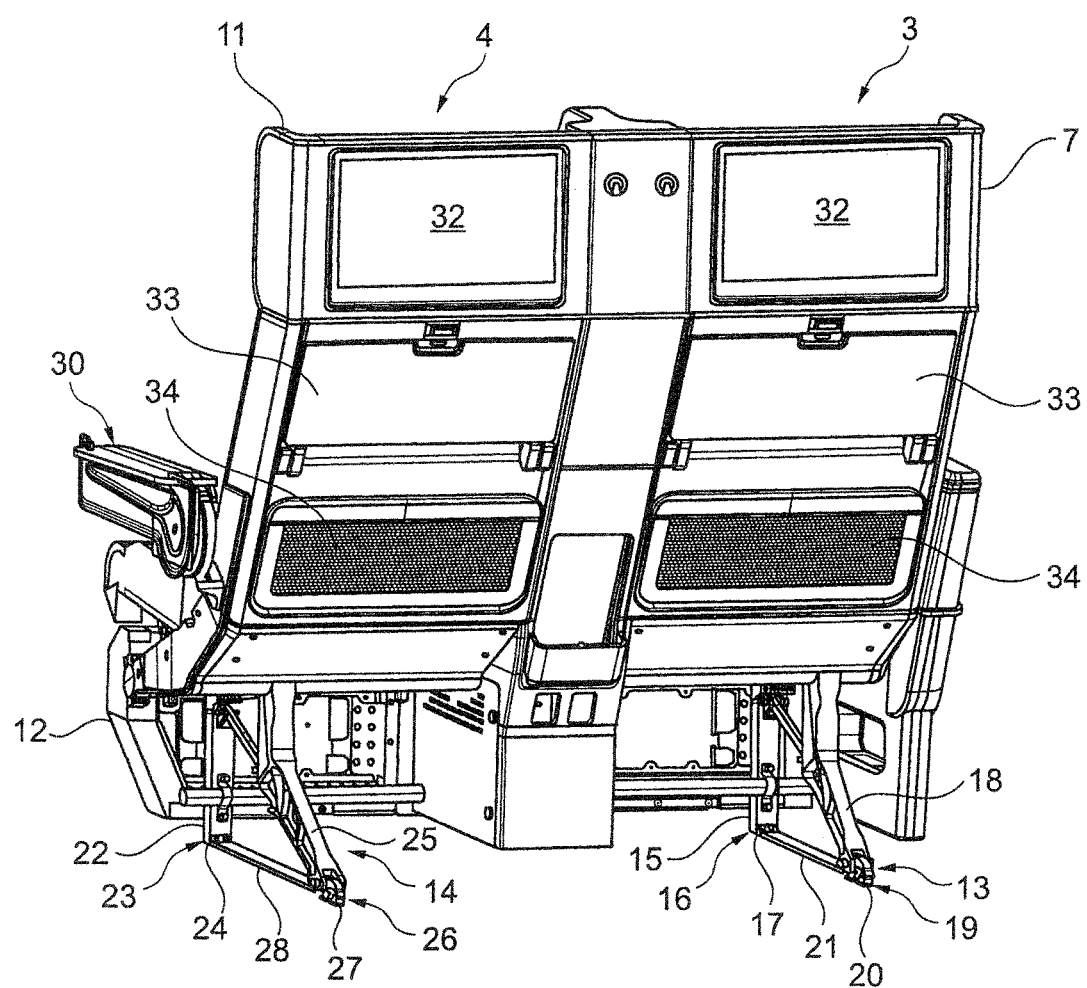
FIG. 2 shows the seat row according to FIG. 1 in a perspective view obliquely from the rear.

For example, in each case a foldable tray element 33 such as a tray table with a table surface is configured below in a region adjoining the multimedia unit 32 or a central region. In FIG. 2 the tray elements 33 are shown in a folded-up, vertical and secured non-use position.

A storage compartment 34, for example, for accommodating magazines or brochures or other objects, is present below the respectively foldable tray element 33.

FIG. 3 shows in a perspective view a basic structure of the seat row 1 of the aircraft passenger seats 3, 4 according to FIGS. 1 and 2. The basic structure comprises, for example, a support framework, structural components 38, 38a, 38b, 38c and seat dividers 37, 37a, 37b, 37c. For example, two cross rails 35, 36 are arranged on a support framework which comprises the support legs 13, 14. Advantageously, the front cross rail 35 and the rear cross rail 36 are oriented approximately parallel to one another. Preferably, a seat divider 37 is arranged on the cross rails 35 and 36. Preferably, two seat dividers 37, 37a are present for the aircraft passenger seat 3 and the further seat dividers 37b, 37c are present for the aircraft passenger seat 4. In particular, the seat dividers 37 to 37c have different material recesses. The seat dividers 37, 37a, 37b, 37c are preferably constructed the same, in particular, identically. The seat divider 37 is designed, in particular, as a planar, angled, for example, arcuate, component. For example, a connecting device 40 (not fully shown) is arranged on the upper end of the seat divider 37.

In an advantageous embodiment, a belt attachment 39 for a safety belt of the aircraft passenger is arranged on each seat divider 37, 37a, 37b, 37c, in particular, all four belt attachments 39 arranged thereon are designed in a similar manner. For example, the belt attachment 39 is screwed onto the seat dividers 37 to 37c, advantageously a safety belt with, in particular, a belt buckle and/or a hook and/or eye adapted to the belt buckle is attached to the belt attachment 39.

Advantageously, the structural components 38, 38a, 38b, 38c are configured to be planar and/or plate-shaped, in particular, they have a width, a depth and a height. In the exemplary embodiment shown, the width is in the region of a few centimeters. The depth of the structural components is a multiple of the width. The height of one respective structural component 38-38c is also a multiple of the width, in particular, the height is greater than the depth. All directions are relative to the three spatial directions of the width 61, depth 62 and height 63 shown in FIG. 3. Advantageously, the depth 62 is oriented parallel to the seating direction 2.

Preferably, the structural components 38, 38a, 38b, 38c are produced, in particular, cut out, from aluminum, for example, with a sandwich construction, in particular, from an aluminum corrugated plate. In a preferred variant, the aluminum corrugated plates have in the interior a wave-shaped structure which, in particular, comprises wave crests and/or wave troughs which, for example, have in each case an apex line. Advantageously, the long side of the structural components 38 to 38c is oriented parallel to the apex line of the wave crests and/or wave troughs. An external surface of the aluminum corrugated plate is configured in a planar manner, in particular as a cover plate which conceals the internal structure of the aluminum corrugated plate.

In the embodiment shown, the structural component 38 or 38c is arranged on the left-hand or right-hand outer face of the seat row consisting of two aircraft passenger seats. Preferably, the two structural components 38 and 38c are shaped in the same manner, in particular, the structural components 38 and 38c have in their respective upper end region, relative to the vertical direction 63, a widening in comparison to the extension in the central and lower region, when viewed in the depth direction 62.

In the variant shown, the structural components 38a and 38b are arranged centrally in the seat row consisting of the aircraft passenger seat 3 and 4. For example, the structural component 38a is the right-hand boundary of the aircraft passenger seat 3 and the structural component 38b the left-hand boundary of the aircraft passenger seat 4. The two structural components 38a and 38b are preferably designed in the same manner, in particular, they have the same shape. Preferably, the structural component 38a or 38b is designed to be widened at its lower end region in the vertical direction 63, in particular, to form a central and/or upper region of the structural component 38a or 38b.

In the embodiment shown, for example, a connecting structure component 41 is arranged on two structural components 38 and 38a. Preferably, the connecting structure component 41 is attached to the upper end of the vertically oriented structural components 38, 38a.

A connecting structure component 41a is arranged between the vertically oriented structural components 38b, 38c. Preferably, the connecting structure component 41 or 41a acts in a stiffening and/or mechanically stabilizing manner with the two vertical structural components 38 and 38a, or 38b and 38c. For example, the connecting structure component 41 and the structural components 38, 38a are connected together by means of connecting mechanisms, for example, angle brackets and/or screws and/or rivets. Similarly, a connection of the connecting structure component and the structural component is possible by means of soldering, welding and/or adhesive bonding, in particular, by a material connection.

Preferably, the structural component 38a or 38b has cutouts and/or recesses. The structural component 38a or 38b is designed to be arranged, in particular, fitted, in these recesses.

Alternatively, an integral embodiment of the structural components 38 and 38a with the connecting structure component 41 is possible. The same applies to the connecting component 41a.

Preferably, the connecting structure component 41 or 41a is configured as a plate-shaped element with, for example, an approximately rectangular shape, with a long and a short side and a thickness. For example, the connecting structure component is oriented such that the long side of the connecting structure component 41 or 41a is arranged in the horizontal direction relative to the aircraft passenger seat. The long side of the connecting structure component 41 or 41a is oriented in the direction of the width 61.

In the embodiment shown in FIG. 3 the connecting structure component 41 terminates with the seat divider 38 at a rear end relative to the seating direction 2. In the seating direction 2 the connecting structure component 41 is arranged slightly offset to the rear relative to the structural component 38a. The recesses or cutouts in which the connecting structure component 41 is fitted on the structural component 38a are arranged, in particular, between a center and a rear end of the structural component 38a, viewed in the seating direction 2.

In FIG. 3 the connecting structure component 41a is fitted into the structural component 38b on the basic structure of the aircraft passenger seat 4, in particular, according to the same principle as the connection of the connecting structure component 41 to the structural component 38a. The connecting structure component 41a terminates in the variant shown with the structural component 38c in a rear region, in particular, at the rear end of the structural component 38a, when viewed in the seating direction 2 or depth direction 62.

Advantageously, the connecting structure components 41 and 41a are connected to the respective structural components 38, 38a, 38b, 38c via connecting mechanisms, in particular, angle brackets and/or screws and/or rivets.

FIG. 3 shows an embodiment in which a further horizontal structural component 42 is arranged between the structural components 38 and 38a of the basic structure of the aircraft passenger seat 3. The horizontal structural component 42 is arranged at the lower end of the structural components 38 and 38a and therebetween. Preferably, the horizontal structural component 42 is located in the region of the lower back of an aircraft passenger when the aircraft passenger has sat down on the aircraft passenger seat 3. The horizontal structural component 42 is advantageously made from aluminum, in particular, from an aluminum corrugated plate. Preferably, a wave-shaped structure is arranged in the aluminum corrugated plate such that an apex line of a wave crest and/or a wave trough is oriented parallel to a long side of the horizontal structural component 42. The long side of the horizontal structural component 42 is advantageously oriented in the direction of the width 61, in particular, parallel.

For example, a horizontal structural component 42a is also arranged on the basic structure of the aircraft passenger seat 4 between the seat dividers 38b and 38c. The horizontal structural component 42a is designed, in particular, in the same or identical manner to the horizontal structural component 42.

In each case, an attachment member for a safety belt is provided on the structural component 42 or 42a, in particular, the attachment member is designed as a belt retractor 45 or 45a.

For example, the belt retractor 45 is arranged on the horizontal structural component 42, in particular, screwed and/or riveted thereon. Preferably, the belt retractor 45 is arranged on the horizontal structural component 42 closer to the structural component 38a than to the structural component 38, when viewed in the width direction. Preferably, the belt retractor 45 is arranged on a mounting element, for example, a mounting plate, in particular, is connected by means of the mounting element to the horizontal structural component 42.

Preferably, the belt retractor 45a is arranged on the horizontal structural component 42a, in particular, screwed and/or riveted thereon. Preferably, the belt retractor 45a is arranged on the horizontal structural component 42a closer to the structural component 38b than to the structural component 38c, when viewed in the width direction.

An attachment element 44 or 44a, in particular, in the form of an attachment plate, is arranged below the connecting structure component 41 or 41a.

Advantageously, a transverse strut 43 or 43a is also arranged below, when viewed in the vertical direction 63. The transverse strut 43 is preferably designed as a U-shaped profile. For example, the transverse strut 43 is configured, in particular, as a cross bar made of aluminum and/or steel.

The attachment element 44 is preferably designed as a deformable, for example, plastically deformable, attachment plate, which is able to absorb energy, in particular, by a defined plastic deformation in a load case. Advantageously, the attachment element 44 is connected to the two structural components 38 and 38a of the aircraft passenger seat 3, in particular, the attachment element 44 is attached by means of connecting mechanisms, for example, screws and/or rivets, to the structural component 38 or 38a.

Preferably, the attachment element 44 encloses the transverse strut 43 on one side of the U-shape. In particular, the attachment element 44 terminates the U-shape of the transverse strut 43 to form a hollow body. For example, an open rear face of the transverse strut 43 is bridged by the attachment element 44. For example, the transverse strut 43 is open at a rear end, when viewed in the depth direction 62.

The transverse strut 43 is preferably fitted, in particular, positively inserted, into a recess on the structural component 38a. The transverse strut 43, preferably viewed in the depth direction 62, bears against the structural component 38 on the rear side and, in particular, the rear narrow side of the structural component 38 has an indentation, in particular, for the transverse strut 43.

Preferably, the attachment element 44 is arched outwardly, in particular, in a U-shaped manner. For example, the attachment element 44 is designed as a bent sheet metal part. Preferably, the transverse strut 43 is arranged in the bulged portion of the attachment element 44. Advantageously, a hollow shape which consists of the transverse strut 43 and a covering portion of the attachment element 44, and which is closed over the substantial width of the aircraft passenger seat, is produced.

Preferably, an attachment member for the safety belt of the aircraft passenger, in particular, configured as a belt deflector 46, is arranged on the attachment element 44.

The belt deflector 46 is arranged on the attachment element 44. Preferably, the belt deflector 46 comprises a fastening point and, in particular, an eye-shaped deflection element which is designed such that the safety belt is guided through the eye-shaped deflection element and at the same time forces which act via the safety belt on the belt deflector 46 may be guided, in particular, diverted.

Preferably, the fastening point of the belt deflector 46 is arranged, in particular, connected, by means of a screw and/or a rivet to the attachment element 44.

In the advantageous embodiment shown, the attachment element 44 and the fastening point of the belt deflector 46 are designed to absorb and/or to dissipate energy by, in particular, a targeted deformation, for example plastic deformation, of the fastening point of the belt deflector 46 and/or the attachment element 44.

The belt deflector 46 is preferably arranged in the width direction 61 closer to the structural component 38a.

The safety belt, not shown in FIG. 3, of the aircraft passenger runs upwardly from the belt retractor 45, in the vertical direction 63 to the belt deflector 45 and then, for example, downwardly over a shoulder of the aircraft passenger and the upper body of the aircraft passenger. This safety belt is present as an additional safety belt to the lap belt. The additional safety belt is able to be fixed to the lap belt, which is closable via a belt buckle, in particular, in the belt buckle of the lap belt.

FIG. 4 shows a perspective view of the structural component 38 to 38c, the connecting structure components 41 and 41a and the horizontal structural components 42 and 42. For example, in the upper region a connecting structure 48 may be seen on the structural component 38.

For example, a connecting structure 48a is also shown on the structural component 38a. The connecting structure 48a is designed, in particular, identically to the connecting structure 48.

The structural component 38b also has a connecting structure 48b. The connecting structure 48b is designed, in particular, identically to the connecting structure 48 and/or 48a.

The structural component 38c preferably also has a connecting structure 48c. The connecting structure 48c is designed, in particular, identically to the connecting structure 48 and/or 48a and/or 48b.

The orientation of the connecting structure 48a through a line 47a is indicated on the structural component 38a. The orientation of the connecting structure 48a is, in particular, an apex line of the wave crests and/or wave troughs.

Advantageously, the connecting structure components 41 and 41a are also designed with a connecting structure, as are the horizontal structural components 42 and 42a. Preferably, the connecting structure in the connecting structure components 41 and 41a and in the horizontal structural components 42 and 42a are designed in the same manner as in the structural components 38 and 38c.

For example, the connecting structure 48 to 48c is configured as an alternating, in particular wave-shaped, structure. Preferably, the connecting structure 48 and 48c is formed from a cohesive element, in particular, from a corrugated component. The wave-shaped connecting structure 48 to 48c preferably has wave crests and wave troughs which, in particular, have an apex line. Preferably, the apex lines are oriented parallel to one another. The apex lines are indicated as lines 47 on the structural component 38 in FIG. 4. The apex lines are also indicated as lines 47a on the structural component 38a and are indicated as lines 47c on the structural component 38c.

FIG. 5 shows a lateral view of the structural components 38 and 38a. In the selected lateral view, the structural component 38 is in the foreground whilst the structural component 38a is in the background. The dashed lines 47 indicate the orientation of the apex lines of the wave crests and/or wave troughs. The lines 47 are oriented parallel to one another. The lines 47 are also oriented parallel to a front long edge 49 and/or parallel to a rear long edge 50 of the structural component 38. In particular, a slightly oblique orientation of the lines 47 with, for example, a small deviation to the front long edge 49 and/or rear long edge 50 is also possible, for example, a deviation of up to 10°.

Figure 6:
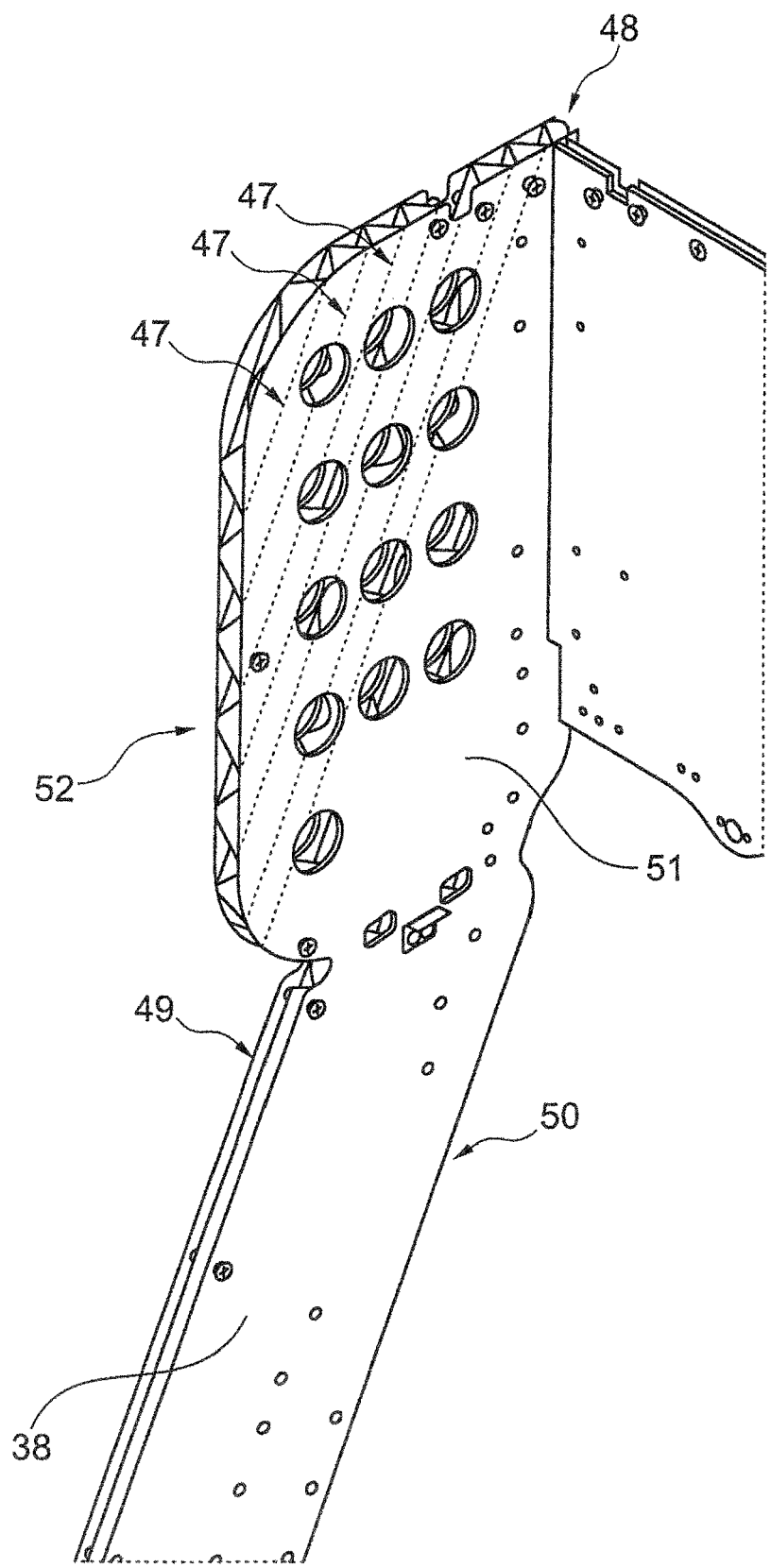
FIG. 6 shows the detail X of FIG. 4 in an enlarged view.

FIG. 6 shows an enlarged detail according to the detail X of FIG. 4. The connecting structure 48 may be seen in the upper region of the structural component 38, in particular, the wave-shaped configuration of the connecting structure 48, which preferably has the regular and/or uniform wave-shaped structure and is configured between two cover plates 51, 52. The orientation of the apex lines is indicated by means of lines 47. Preferably, a front long edge 49 and a rear long edge 50 of the structural component 38 are also oriented parallel to one another and thus also to the apex lines illustrated as lines 47 of the connecting structure 48.

LIST OF REFERENCE NUMERALS

1 Seat row
2 Seating direction
3 Aircraft passenger seat
4 Aircraft passenger seat
5 Seat base
6 Backrest
7 Housing
8 Leg support
9 Seat base
10 Backrest
11 Housing
12 Leg support
13 Support leg
14 Support leg
15 Strut
16 End region
17 Mounting point
18 Strut
19 End region
20 Mounting point
21 Bracing element
22 Strut
23 End region
24 Mounting point
25 Strut
26 End region
27 Mounting point
28 Bracing element
29 Armrest
30 Armrest
31 Console
32 Multimedia unit
33 Tray element
34 Storage compartment
35 Front cross rail
36 Rear cross rail
37 Seat divider
37a Seat divider
37b Seat divider
37c Seat divider
38 Structural component 38a Structural component
38b Structural component
38c Structural component
39 Belt attachment
40 Connecting device
41 Connecting structure component
41a Connecting structure component
42 Horizontal structural component
42a Horizontal structural component
43 Transverse strut
43a Transverse strut
44 Attachment element
44a Attachment element
45 Belt retractor
45a Belt retractor
46 Belt deflector
46a Belt deflector
47 Line
47a Line
47c Line
48 Connecting structure
48a Connecting structure
48b Connecting structure
48c Connecting structure
49 Edge
49a Edge
49b Edge
49c Edge
50 Edge
50a Edge
50b Edge
50c Edge
51 Cover plate
52 Cover plate
53 to 60 Unused
61 Width
62 Depth
63 Height

The invention claimed is:

1. An aircraft passenger seat comprising:
a support framework, the support framework being designed to be fastened to a floor in an aircraft passenger cabin,
wherein the support framework has a seat divider and cross rails running transversely to a seating direction,
wherein the seat divider is held by the cross rails,
wherein a housing comprises a structural component,
wherein the housing surrounds a backrest, and the backrest is adjustable relative to the housing,
wherein the structural component is arranged on the seat divider,
wherein the structural component comprises a composite plate component,
wherein the composite plate component has two or more cover plates,
wherein a connecting structure is provided between the two or more cover plates,
wherein gaps are produced between the two or more cover plates by the connecting structure,
wherein the volume of the gaps makes up at least 50% of the volume between the two or more cover plates of the composite plate component, and
wherein the housing is positionally fixed and immovable during adjustment of the backrest;
wherein the backrest is arranged in a shell shape of the housing; and
wherein the structural component of the housing extends to the full height of the backrest.

2. The aircraft passenger seat according to claim 1, wherein the connecting structure extends in a cross section of the composite plate component alternating between the cover plates, wherein the alternating connecting structure is in contact with the cover plates.

3. The aircraft passenger seat according to claim 2, wherein the alternating connecting structure has maximum points, wherein the alternating connecting structure is connected to the cover plates at some of the maximum points.

4. The aircraft passenger seat according to claim 3, wherein the maximum points run along a line.

5. The aircraft passenger seat according to claim 4, wherein the maximum points run along a strip with a contact surface.

6. The aircraft passenger seat according to claim 5 including two or more lines and/or two or more strips, wherein the lines and/or the strips within the composite plate component are oriented approximately parallel to one another.

7. The aircraft passenger seat according to claim 5, including two or more lines and/or two or more strips, wherein the structural component has a long side with a long edge and a comparatively shorter side with a shorter edge, and the lines and/or the strips of the maximum points of the connecting structure in the composite plate component are oriented parallel to the long edge of the structural component.

8. The aircraft passenger seat according to claim 1, wherein the connecting structure is configured to be wave-shaped in cross section.

9. The aircraft passenger seat according to claim 1, wherein the composite plate component comprises a portion made of a metal.

10. A seat row comprising at least two aircraft passenger seats according to claim 1.

11. The aircraft passenger seat according to claim 1, wherein the structural component and the seat divider are rigidly connected together in an immovable and fixed manner.

* * * * *